United States Patent [19]

Sjöberg

[11] 4,339,333
[45] Jul. 13, 1982

[54] FILTRATION DEVICE

[75] Inventor: Peter Sjöberg, Löddeköpinge, Sweden

[73] Assignee: Alfa-Laval AB, Tumba, Sweden

[21] Appl. No.: 19,630

[22] Filed: Mar. 12, 1979

[30] Foreign Application Priority Data

Mar. 15, 1978 [SE] Sweden .............................. 7802969

[51] Int. Cl.³ .................... B01D 29/20; B01D 29/38; B01D 37/00
[52] U.S. Cl. .................................... 210/411; 55/302; 55/314; 210/421; 210/422; 210/430
[58] Field of Search ......................... 55/302, 312, 314; 210/420, 421, 108, 422, 423, 333 R, 428, 429, 427, 430, 431, 411, 305, 306, 314, 316, 335, 336, 339, 130, 132, 133, 254, 407, 409, 435, 456

[56] References Cited

U.S. PATENT DOCUMENTS

| | | | |
|---|---|---|---|
| 1,137,075 | 4/1915 | Morris | 210/430 |
| 3,143,139 | 8/1964 | Pretti | 210/427 |
| 4,059,518 | 11/1977 | Rishel | 210/108 |

FOREIGN PATENT DOCUMENTS

1413878 11/1975 United Kingdom .

Primary Examiner—Frank Sever
Attorney, Agent, or Firm—Cyrus S. Hapgood

[57] ABSTRACT

A filter device comprising a tubular housing with an inlet for the fluid to be filtered in one end of the housing, an outlet for filtrate in the opposite end of the housing and a filter tube mounted inside the housing and extending essentially in the axial direction of the tubular housing. At least part of the filter tube wall forms the filter surface. One end of the filter is openly connected to said inlet, whereas the other end is closed so that an annular feed conduit is formed between the housing and the filter tube. A first valve means is arranged inside the filter tube to shut off the filter tube, during cleaning periods, thereby dividing the filter tube and the filter surface into an upstream part and a downstream part, and forcing the entire filtrate stream to pass through said upstream part of the filter surface into the filtrate conduit. The downstream part of the filter tube is provided with a discharge conduit comprising a second valve means to cause, by opening said second valve means at said cleaning periods, part of the filtrate stream from the filtrate conduit to stream back through the downstream part of the filter surface, thereby removing rejected material settled thereon out through said discharge conduit.

8 Claims, 1 Drawing Figure

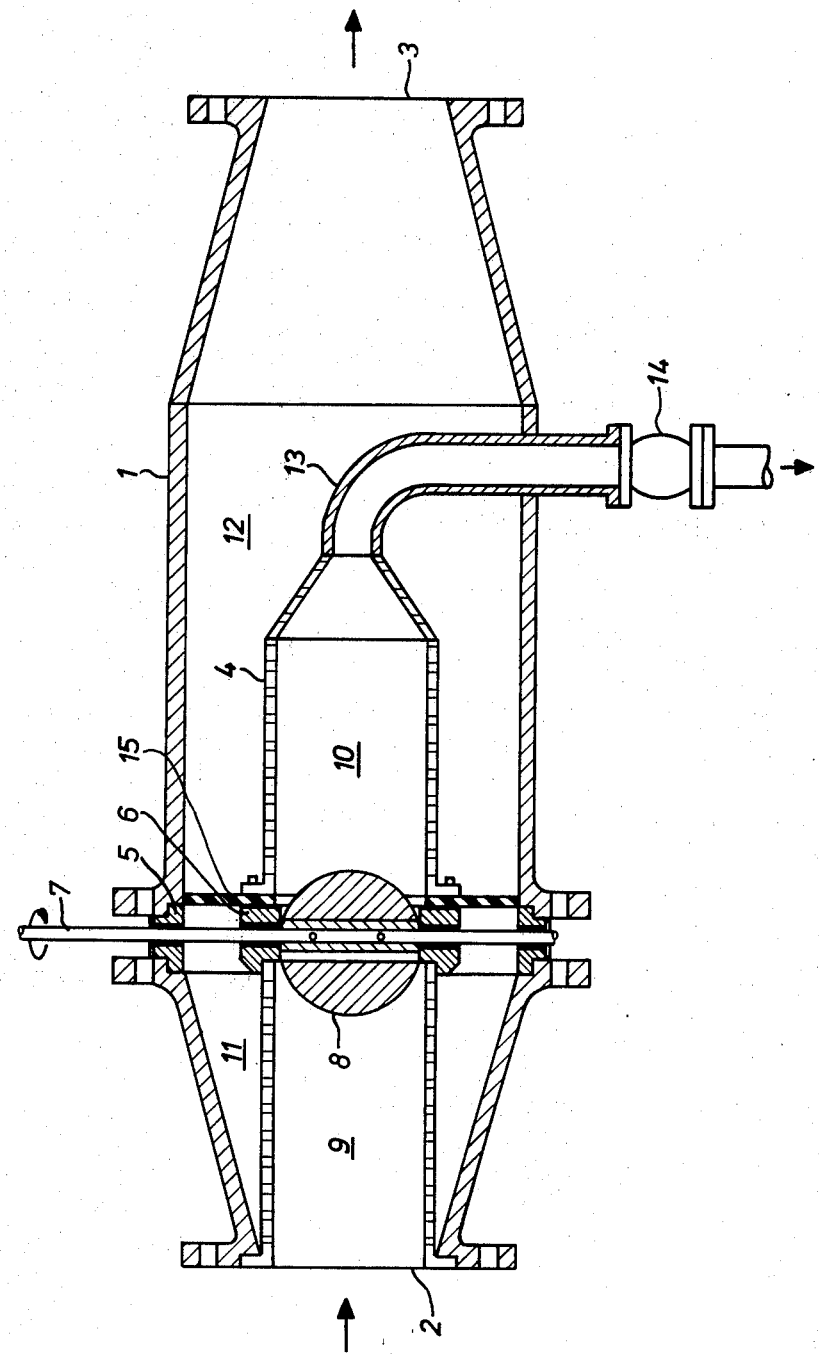

FILTRATION DEVICE

The present invention relates to filtration devices. In particular, the invention relates to new design details in a simple conventional tube filter device to achieve periodic cleaning of the filter without interruptions or substantial fluctuations in filtrate output.

Many industrial processes include filtration steps, in which it is desirable to produce a uniform and continuous filtrate stream to successive process steps. A common example is the use of straining means at the inlet of various process apparatus to prevent particles in the feed stream from causing a gradual clogging of the apparatus. Without such straining means the apparatus must be opened periodically and cleaned. In many cases, such as straining device is not obligatory. A plate heat exchanger, e.g., can often work continuously for quite a long time without any special straining device, even if it eventually must be taken out of operation for disassembling and cleaning the plates. In this case, a conventional alternative to a straining device consists of periodic back-flushing of the entire plate package. The disadvantages of this alternative are that it usually does not provide complete cleaning and that the changes in flow conditions are often undesired.

Generally desirable characteristics of any filtering device are: high output in combination with low pressure drop, simple and inexpensive design, operation safety and—especially in filtering devices for the use in combined unit processes—a uniform and continuous product flow. In applications in which a filter device is not necessary, these desirable features become definite requirements which must be complied with to a certain extent in order to make a filter installation economically competitive.

A large number of filter devices are known which are designed either for periodic self-cleaning or for cleaning of the filter devices when so is required, for example, through back-flushing achieved by reversing the flow direction. Self-cleaning filter devices roughly constitute a group of special and unusual devices, in which the elegant and self-controlling functioning has been achieved at the price of a complicated apparatus and high pressure drops with respect to the flow capacity. Among a second group of filter devices, in which cleaning is achieved by means of valve-controlled changes of flow direction, there are two main types. In the first type, the cleaning problem is solved by simply providing the device with double filters so that one filter can be back-flushed while the other one is in operation. The disadvantages of such a device are that the arrangement is unnecessarily expensive due to the fact that only part of the filter capacity is utilized at any time, and that unnecessarily large amounts of process fluid are often lost in the back-flushing. In the second type, the existing filter is simply back-flushed periodically, which requires that output interruptions can be accepted.

The present invention provides a filter device which is simple to manufacture and inexpensive with respect to its flow capacity, which exhibits low pressure drop losses, and which can be cleaned periodically without any substantial change in filtrate flow or pressure drop during the cleaning periods.

A filter device according to the present invention comprises a tubular housing with an inlet for the fluid to be filtered in one end of the housing, an outlet for filtrate in the opposite end of the housing and a filter tube mounted inside the housing and extending essentially in the axial direction of the tubular housing. At least part of the filter tube wall forms the filter surface. One end of the filter is openly connected to said inlet, whereas the other end is closed so that an annular filtrate conduit is formed between the housing and the filter tube. A first valve means is arranged inside the filter tube to shut off the filter tube during cleaning periods, thereby dividing the filter tube and the filter surface into an upstream part and a downstream part, and forcing the entire filtrate stream to pass through said upstream part of the filter surface into the filtrate conduit. The downstream part of the filter tube is provided with a discharge conduit comprising a second valve means to cause, by opening said second valve means at said cleaning periods, part of the filtrate stream from the filtrate conduit to stream back through the downstream part of the filter surface, thereby removing rejected material settled thereon out through said discharge conduit.

The new filter device is characterized in that the cross-sectional area of said annular filtrate conduit is constant along substantially all of said downstream part of the filter tube to insure, during cleaning, a uniform backstreaming of the filter surface of said downstream part. Also, said first valve means is located in the filter tube so that when it is closed during cleaning, sufficient filter surface is provided in said upstream part of the filter tube to maintain the major part of the normal filtrate flow through said outlet.

In normal performance, this filter device provides the same high output and low pressure drop as a corresponding conventional tube filter device without a back-flow arrangement. Even during the cleaning periods, the main part of the filtrate flow can be maintained without any substantial increase of the pressure drop. This is due to fact that the present invention takes advantage of the uneven pressure-flow pattern which prevails in a conventional tube filter device having an inside filter tube coaxially mounted in a surrounding tube. In such a filter, whether it is arranged for a filtrate flow in or out through the filter tube walls, the mass equilibrium causes the flow velocity of the feed stream to be high at the upstream part of the filter and low at the downstream part, whereas the opposite condition is valid for the filtrate stream. Since a high flow velocity implies low static pressure and vice versa, a larger driving pressure for filtrate flow through the downstream part of the filter is obtained, whereas a smaller driving pressure or no driving pressure at all is obtained at the upstream end of the filter. In some cases back-flow can even occur at the upstream end of the filter. Consequently, reject material primarily settles on the downstream part of the filter, and particles that may momentarily stick to the upsteam part of the filter are dislodged by the feed stream, and carried on to the downstream part of the filter.

In a device according to the invention, reject material will settle on the upstream part of the filter surface during the cleaning period, which for most applications is a very short period in comparison with the periods of normal operation, since the filter tube is then closed by means of the said first valve means. This reject material, however, will be carried away by the feed stream as soon as the valve means is reopened when returning to normal operation. To further prevent substantial amounts of reject material from settling on the upstream part of the filter surface, a third valve means can be arranged in the filtrate conduit near the division point between the upstream and the downstream part of the filter. This valve means is designed to block the filtrate stream during normal operation, but to provide as little resistance as possible to the filtrate stream during the cleaning periods when the entire filtrate stream is forced to pass through this valve means. The valve means can be suitably designed to be self-controlling so that it opens at the beginning of the cleaning period by the influence of the increased pressure in the upstream part of the filtrate conduit.

Since the downstream part of the filter tube can be opened to a separate discharge conduit by means of said second valve means, a smaller part of the total filtrate stream can be forced during the cleaning periods to stream back through the downstream part of the filter surface removing reject material settled thereon, while the main part of the filtrate stream will still pass out through the filtrate outlet of the device since the downstream part of the filtrate conduit is directly opened to said outlet.

Due to varying amounts of reject materials which settle on the filter surface and the varying adhesion of the reject material to the filter, the intervals between the cleaning periods and the lengths of the cleaning periods must be adjusted to the individual case. The amount of filtrate used for back-flushing the filter can be controlled by suitable dimensioning of the back-flow discharge conduit and by controlling the opening of the valve connected to the discharge conduit.

An embodiment of the filtration device according to the invention will now be described, by way of example, with reference to the accompanied drawing.

The filtration device shown in the drawing has a tubular housing 1 provided with a feed inlet 2 and a filtrate outlet 3. Inside the housing a filter tube 4 is mounted with its upstream end openly connected to the inlet 2. The housing 1 and the filter tube 4 are each divided into two sections, which are bolted or otherwise fixed to each other, clamping an intermediate outer ring 5 and an inner ring 6. The rings support a so-called butterfly valve 7, 8, the turntable valve shaft 7 of which is journalled in a bushing through the rings 5 and 6. The inner ring 6 is fixed to the outer ring 5 by a number of spokes, as well as by the valve shaft 7, said rings and spokes preferably being cast in a single unit. The circular valve disk 8 is fixed to the shaft 7 inside the filter tube 4 to shut off the filter tube 4 during filter cleaning and to divide the the filter tube 4 into an upstream part 9 and a downstream part 10. Reference numerals 11 and 12 designate the corresponding upstream and downstream parts of the annular space that forms the filtrate conduit between the housing 1 and the filter tube 4. The downstream part 10 of the filter tube 4 converges conically towards a discharge conduit 13 for discharging, during the cleaning periods, the reject material settled on the downstream part 10 of the filter tube by means of back-flushed filtrate from the downstream part 12 of the filtrate conduit. A valve means 14 is arranged in the discharge conduit 13 to open the conduit during filter cleaning.

In the embodiment shown in the drawing a third valve means 15 is also arranged in the annular space between the filter tube 4 and the housing 1. As mentioned above, such a valve member is often not required for satisfactory operation of the device according to the invention. However, in certain cases such a third valve means can provide a more reliable operation by completely preventing any clogging of reject material on the filter surface of the upstream part 9 of the filter. The valve member 15 has been given the very simple design of a stiff annular membrane fixed around the periphery of the filter tube 4. This membrane serves as a self-controlling valve. In normal operation of the filter, it seals against the housing 1 or at least forms a comparatively effective bar to the filtrate flow from the upstream part 11 to the downstream part 12 of the filtrate conduit. At the start of the cleaning period, which is initiated by shuting off the filter tube 4 by means of the valve 7,8, the valve member 15 will yield to the increased pressure in the upstream part 11 of the filtrate conduit and open for the filtrate flow. The larger part of the filtrate flows out through the outlet 3 and the smaller part streams back into the downstream part 10 of the filter 4, removing the reject material settled on the filter surface through the discharge conduit 13 and the open valve 14. This relationship, of course, requires that the upstream part 9 of the filter have a sufficient filter surface to insure that the major part of the filtrate flow through outlet 3 during normal filtering (with valve 7, 8 open and valve 14 closed) will flow through outlet 3 during the cleaning operation, all other operating conditions being unchanged. As shown, the upstream part 9 has a filter surface at least as large as that of the downstream part 10.

The filter device according to the invention is suitable for a continuous output of a filtrate stream for long periods. The valves can be switched manually or automatically for the changes between normal operation and cleaning. The selection of equipment for automatic control of the filter is not essential to the invention. Persons of ordinary skill in the art can easily provide the filter device with a control system of conventional components such as time relays, magnetic valves and pneumatic mechanisms for the valves. For most applications, in which comparatively constant operating conditions prevail, it is completely satisfactory to provide cleaning periods after empirically determined time intervals by means of pre-set time relays. If in certain applications varying flows or reject concentrations are to be expected, the device should be provided with some kind of safety arrangement for initiating extraordinary cleaning periods which may be required. The start signal for such a cleaning period can be obtained from a pressure transducer which signals when the pressure drop in the filtration device exceeds a certain value.

The choice of filter design is not essential to the invention, but the type of filter must of course be adjusted to the specific application. If coarse straining is intended, for example, the filter tube can consist of perforated stainless steel tube. If filtration of finer suspensions or emulsions is intended, a separate filter medium can be applied around or inside the filter tube, the tube wall forming a perforated filter support. Selection of filter tube material and housing material is also freely adapted to the application concerned. If the filtrate is corrosive such as, for example, sea-water; a relatively bulky housing can be made of ordinary commercial iron and internally be provided with a corrosion proof lining, such as a rubber lining, and the filter tube and the movable valve parts can be suitably made of stainless steel or red brass.

As mentioned at the outset, the distinguishing characteristics of the device according to the invention are high filtrate output in combination with low pressure drop and, particularly, the fact that these two features are essentially maintained during the cleaning periods.

As an example of the achievement of these features by a filtration device in accordance with our invention, the following performance data was measured at a feed water straining device of the type described with reference to the accompanied drawing. The diameter of the inlet and filter tube was 300 mm. The length of the cylindrical part of the filter tube was 1050 mm. The cylindrical wall was provided with 2.5 mm diameter perforations. The perforations constituted 46% of the total tubular wall surface. The internal diameter of the cylindrical part of the filter tube was 480 mm and the outlet diameter was 300 mm. A pressure drop of 75 mm Hg was measured during normal performance and no substantial increase in pressure drop was observed up to each cleaning period, which occurred every 12 hours and lasted for one minute. The measured output was 1000 m$^3$/h during normal performance, decreasing during the cleaning periods at constant feed pump power down to 900 m$^3$/h, that is about 90% of the flow at normal performance.

I claim:

1. A filter device which comprises a tubular housing with an inlet for the fluid to be filtered in one end of the housing; an outlet for filtrate in the opposite end of the housing; a filter tube mounted inside the housing and extending essentially in the axial direction of the tubular housing, at least part of the filter tube wall forming a filter surface, and one end of the filter tube being openly connected to said inlet, whereas the other end being closed so that an annular filtrate conduit is formed between the housing and the filter tube; a first valve means arranged inside the filter tube to shut off the filter tube during cleaning periods, dividing the filter tube and the filter surface into an upstream part and a downstream part, and forcing the entire filtrate stream to pass through said upstream part of the filter surface into the filtrate conduit; the downstream part of the filter tube being provided with a discharge conduit comprising a second valve means to cause, by opening said second valve means during said cleaning periods, part of the filtrate stream from the filtrate conduit to stream back through the downstream part of the filter surface, thereby removing through said discharge conduit the rejected material settled on the filter surface, the cross-sectional area of said annular filtrate conduit being constant along substantially all of said downstream part of the filter tube to ensure, during said cleaning periods, a uniform backstreaming of the filter surface of said downstream part, and said first valve means being so located in the filter tube that sufficient filter surface is provided in said upstream part to maintain, during said cleaning periods, a filtrate flow through said outlet which is equal to the major part of the filtrate flow through said outlet during normal filtering.

2. A filter device according to claim 1, further comprising a third valve means arranged in the filtrate conduit near the change-over between said upstream part and said downstream part for the purpose of at least partially preventing filtrate to flow through the upstream part of the filter surface in normal performance, thereby preventing clogging of reject material on the filter surface.

3. A filter device according to claim 2, wherein said third valve means is self-controlling to be opened by the direct influence of the pressure increase in the upstream part of the filtrate conduit that arises upon closing of said first valve means.

4. A filter device according to claim 3 wherein that the third valve means consists of an annular membrane fixed at the periphery of the filter tube.

5. A filter device according to claim 2 wherein said first valve means is a butterfly valve.

6. A filter device according to claim 2, in which said upstream part has a filter surface at least as large as the filter surface of said downstream part.

7. A filter device according to claim 1 wherein said first valve means is a butterfly valve.

8. A filter device according to claim 1, in which said upstream part has a filter surface at least as large as the filter surface of said downstream part.

* * * * *